US011221173B2

(12) United States Patent
Eckman et al.

(10) Patent No.: US 11,221,173 B2
(45) Date of Patent: Jan. 11, 2022

(54) CONTROLLED DEFROST FOR CHILLED ENVIRONMENTS

(71) Applicant: Lineage Logistics, LLC, Irvine, CA (US)

(72) Inventors: Christopher Frank Eckman, San Francisco, CA (US); Maxwell Micali, Berkeley, CA (US)

(73) Assignee: Lineage Logistics, LLC, Irvine, CA (US)

( * ) Notice: Subject to any disclaimer, the term of this patent is extended or adjusted under 35 U.S.C. 154(b) by 0 days.

(21) Appl. No.: 16/683,164

(22) Filed: Nov. 13, 2019

(65) Prior Publication Data

US 2021/0140701 A1 May 13, 2021

(51) Int. Cl.
*F25D 21/00* (2006.01)
*F25B 39/02* (2006.01)
*F25D 21/02* (2006.01)
*G01J 5/02* (2006.01)
*G01J 5/60* (2006.01)

(52) U.S. Cl.
CPC ............ *F25D 21/006* (2013.01); *F25B 39/02* (2013.01); *F25D 21/008* (2013.01); *F25D 21/02* (2013.01); *G01J 5/0205* (2013.01); *G01J 5/60* (2013.01)

(58) Field of Classification Search
CPC ....... F25D 21/006; F25D 21/008; F25D 21/02
See application file for complete search history.

(56) References Cited

U.S. PATENT DOCUMENTS

| 4,104,888 | A | * | 8/1978 | Reedy | F25D 21/006 62/80 |
| 4,409,795 | A | * | 10/1983 | Krueger | F25D 21/02 250/222.2 |
| 4,563,877 | A | * | 1/1986 | Harnish | F25D 21/002 62/156 |

(Continued)

FOREIGN PATENT DOCUMENTS

| CN | 108759258 A | * | 11/2018 |
| EP | 2541174 | | 1/2013 |

(Continued)

OTHER PUBLICATIONS

International Search Report and Written Opinion in International Application No. PCT/US2020/060496, dated Feb. 24, 2021, 14 pages.

*Primary Examiner* — Nelson J Nieves
(74) *Attorney, Agent, or Firm* — Fish & Richardson P.C.

(57) ABSTRACT

In one implementation, a system for controlling defrost of a chilled environment includes a camera configured to capture images of one or more objects located in the chilled environment and a defrost control unit. The defrost control unit is configured to: receive an image of the one or more objects from the camera, analyze the image of the one or more objects to quantify an amount of frost formation on the one or more objects, determine when to initiate a defrost cycle in the chilled environment based on the amount of frost formation on the one or more objects, and in response to determining to initiate the defrost cycle, initiating the defrost cycle by sending a defrost control signal to a defroster. The defroster is configured to perform the defrost cycle within the chilled environment in response to receiving the defrost control signal.

20 Claims, 5 Drawing Sheets

(56) References Cited

U.S. PATENT DOCUMENTS

| | | | | |
|---|---|---|---|---|
| 4,578,959 A | * | 4/1986 | Alsenz | F25D 21/02 |
| | | | | 250/340 |
| 4,590,771 A | * | 5/1986 | Shaffer | F25D 21/006 |
| | | | | 62/155 |
| 10,670,328 B2 | * | 6/2020 | Park | F25D 27/005 |
| 2006/0242982 A1 | * | 11/2006 | Swofford | F25D 21/006 |
| | | | | 62/248 |
| 2007/0180838 A1 | * | 8/2007 | Shah | F25D 21/008 |
| | | | | 62/150 |
| 2008/0105822 A1 | * | 5/2008 | King | G02B 23/12 |
| | | | | 250/330 |
| 2011/0094245 A1 | * | 4/2011 | Kim | F25D 21/02 |
| | | | | 62/80 |
| 2017/0276422 A1 | * | 9/2017 | Chamoun | F25B 1/10 |
| 2020/0049393 A1 | * | 2/2020 | Albets Chico | F25D 21/004 |

FOREIGN PATENT DOCUMENTS

| | | | |
|---|---|---|---|
| JP | 2007255811 | 10/2007 | |
| JP | 2012007819 | 1/2012 | |
| JP | 2015143579 | 8/2015 | |
| KR | 101499499 B1 * | 3/2015 | |
| KR | 20170021533 A * | 2/2017 | |
| WO | WO-2011122887 A2 * | 10/2011 | F25D 21/02 |

* cited by examiner

CONTROLLED DEFROST FOR CHILLED ENVIRONMENTS

TECHNICAL FIELD

This specification relates to technology for efficiently controlling defrost cycles for objects in chilled environments.

BACKGROUND

Convective air blast freezing is a process by which freezing of items like foodstuffs is facilitated by flowing very cold air over the items located in a blast cell via mechanical force. Large volumes of goods (e.g., many pallets) are commonly frozen at once within the blast cell by forcefully blowing chilled air over and/or through the items at high airflow rates (e.g., thousands of cubic feet per minute (CFM)). Blast freezing is often used on perishable foods (e.g., fruits and meats) geographically near their point of initial food processing. Such goods may then be stored for a short or long period in frozen warehouse, and then shipped to a point close to their use (e.g., to a grocery store or a warehouse operated by a particular grocer).

SUMMARY

This document generally describes technology for automatically controlling defrost cycles for removing frost from objects based on the amount of frost that has formed on the objects. For example, a defrost control unit can initiate and control defrost cycles for removing frost from coils, fins, and/or other components of an evaporator used in blast freezing. The defrost control unit can determine when to initiate a defrost cycle based on the amount of frost that has formed on the object(s). The defrost control unit can initiate the defrost cycle when at least a threshold amount of frost has formed on the object(s). If multiple objects are being defrosted, the defrost control unit can initiate the defrost cycle when at least a threshold number or threshold percentage of the objects have at least a threshold amount of frost on the objects. The threshold(s) can be set so as to ensure that defrost cycles occur before frost accumulates to a level that would degrade performance of the evaporator (or other object(s)) by an unacceptable amount.

The defrost control unit can quantify the amount of frost that has formed on the object(s) based on an analysis of one or more images of the object(s). A camera can be configured to detect light within a particular range of wavelengths for which the reflectivity of ice is significantly different from the reflectivity of the surface of the object(s) on which the ice/frost forms, such that areas of frost formation can be readily distinguished from the surface of the object(s). For example, if the surface of the object is steel, aluminum, or another metal having similar reflectivity, the difference in reflectivity between frost and the surface is most pronounced in the range of wavelengths between about 2.8 micrometers (μm) and about 3.2 μm. Using such a camera, the images captured by the camera can more clearly show areas that are covered by frost relative to areas that are not covered by frost.

In one implementation, a system for controlling defrost of a chilled environment includes a camera configured to capture images of one or more objects located in the chilled environment and a defrost control unit. The defrost control unit is configured to: receive an image of the one or more objects from the camera, analyze the image of the one or more objects to quantify an amount of frost formation on the one or more objects, determine when to initiate a defrost cycle in the chilled environment based on the amount of frost formation on the one or more objects, and in response to determining to initiate the defrost cycle, initiating the defrost cycle by sending a defrost control signal to a defroster. The defroster is configured to perform the defrost cycle within the chilled environment in response to receiving the defrost control signal.

Such an implementation can optionally include one or more of the following features. The camera can be located in the chilled environment and includes a heated lens. The camera can be an infrared camera that is configured to detect light within a particular range of wavelengths within an infrared wavelength spectrum. When a surface is covered with frost or ice, the light within the particular range of wavelengths can reflect off the surface differently than when the surface is not covered with frost or ice. The particular range of infrared wavelengths can be from a first wavelength that is greater than or equal to 2.8 micrometers to a second wavelength that is less than or equal to 3.2 micrometers. The defrost control unit can be further configured to set a duration of time for which the defrost cycle is to be performed based on previous durations of time taken by the defrost system to remove frost formation from the one or more objects.

Such optional features can further include the following. The defrost control unit can be further configured to perform the defrost cycle until less than or equal to a threshold amount of frost is detected on the one or more objects. The defrost control unit performing the defrost cycle until less than or equal to the threshold amount of frost is detected on the one or more objects can include repeatedly performing the following during the defrost cycle until less than or equal to the threshold amount of frost is detected on the one or more objects: receive an additional image of the one or more objects from the camera, analyze the additional image of the one or more objects to quantify an amount of remaining frost on the one or more objects, and determine whether the amount of remaining frost on the one or more objects is less than or equal to the threshold amount of frost. In response to determining that the amount of remaining frost on the one or more objects is less than or equal to the threshold amount of frost, the defrost cycle can be stopped. The threshold amount of frost can be no frost on the one or more objects. The threshold amount of frost to determine when to stop the defrost cycle can be less than a threshold amount of frost that is used to determine when to initiate the defrost cycle. During the defrost cycle the receive, analyze, and determine operations can be performed at a repeated time interval until less than or equal to the threshold amount of frost is detected on the one or more objects.

Such optional features can additionally include the following. The one or more objects can include an evaporator that has coils and fins. The defrost control unit can be further configured to quantify an amount of frost formation on the one or more objects by determining, based on analysis of one or more images of the one or more objects captured by the camera, a quantity of the fins on which at least a threshold amount of frost has accumulated. The defrost control unit can be further configured to initiate the defrost cycle in the chilled environment in response to identifying that the quantity of the fins on which at least the threshold amount of frost has accumulated meets or exceeds a threshold quantity of fins. The defrost control unit can determine when to initiate a defrost cycle in the chilled environment based further on at least one of (i) a difference in temperature between an intake side of the evaporator coils and a rear exit of the evaporator coils or (ii) a difference in humidity between an intake side of the evaporator coils and a rear exit of the evaporator coils. The defrost control unit can determine when to initiate a defrost cycle in the chilled environment based further on an amount of back pressure in the evaporator coils developed by a defrost agent.

Such optional features can additionally include the following. The defrost control unit can be further configured to: obtain data that indicates an accumulated amount of frost formation on the one or more objects based on an amount of frost formation detected in a sequence of previous images of the one or more objects, determine a difference between the amount of frost formation detected on the image and an amount of frost formation detected on a previous image, and update the data that indicates the accumulated amount of frost formation based on the difference. The defrost control unit can be further configured to initiate the defrost cycle in the chilled environment in response to identifying that the updated accumulated amount meets or exceeds a threshold amount of frost formation. Analyzing the image of the one or more objects to quantify the amount of frost formation on the one or more objects can include distinguishing frost on the one or more objects from the objects themselves based on a difference in reflectivity between the frost and the one or more objects within a particular range of infrared wavelengths of the camera.

In another implementation, a method for controlling defrost of a chilled environment includes receiving, at a defrost control unit, an image of one or more objects located in the chilled environment from a camera configured to capture images of the one or more objects and analyzing, by the defrost control unit, the image of the one or more objects to quantify an amount of frost formation on the one or more objects. The method can further include determining when to initiate a defrost cycle in the chilled environment based on the amount of frost formation on the one or more objects, and in response to determining to initiate the defrost cycle, initiating the defrost cycle by sending a defrost control signal to a defroster. The defroster can be configured to perform the defrost cycle within the chilled environment in response to receiving the defrost control signal.

Such a method can optionally include one or more of the following features, and/or one or more of the other optional features discussed in the preceding paragraphs. The method can further include repeatedly performing the following during the defrost cycle until less than or equal to a threshold amount of frost is detected on the one or more objects: receiving an additional image of the one or more objects from the camera, analyzing the additional image of the one or more objects to quantify an amount of remaining frost on the one or more objects, and determining whether the amount of remaining frost on the one or more objects is less than or equal to the threshold amount of frost. In response to determining that the amount of remaining frost on the one or more objects is less than or equal to the threshold amount of frost, stopping the defrost cycle. The method can further include quantifying an amount of frost formation on the one or more objects by determining, based on analysis of one or more images of the one or more objects captured by the camera, a quantity of the fins on which at least a threshold amount of frost has accumulated, and initiating the defrost cycle in the chilled environment in response to identifying that the quantity of the fins on which at least the threshold amount of frost has accumulated meets or exceeds a threshold quantity of fins.

Particular implementations may realize one or more of the following advantages. By monitoring the amount of frost formation on objects and initiating defrost cycles only when the amount of frost exceeds a threshold (e.g., a maximum desired amount), resources (e.g., energy and water) are not wasted by performing defrost cycles when it is not needed and heat is not introduced into a chilled environment unnecessarily. For example, any heat introduced into the chilled environment will need to be removed to keep items in the chilled environment frozen. Reducing the amount of heat introduced into the chilled environment also increases the efficiency of the blast freezing, e.g., by reducing the amount of time the blast freeze cycles are performed, and reduces the amount of resources needed to keep the items frozen. Preventing unnecessary heat from being introduced into the chilled environment also prevents frozen food from thawing, which in turn, prevents the food from decaying due to the thawing.

Not only does the system ensure that defrost cycles are not performed prematurely or too frequently thereby saving energy and minimizing unnecessary introduction of heat into the chilled environment (as described here), but the system also ensures that the defrost cycle occurs with sufficient frequency to prevent degradation of the performance of the blast cell (or other object(s)) or before the cost of the defrost cycle becomes too high due to too much frost accumulation. For example, too much frost on fins of an evaporator reduces the heat transfer between the air in the chilled environment and the evaporator's coil, thereby reducing the efficiency of the blast cell. By monitoring the frost formation and performing defrost cycles when the amount of frost formation reaches a threshold amount, the blast cell operates more efficiently and the components of the blast cell are protected from degradation.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Described below are various implementations of methods, systems, and techniques for initiating and controlling defrost cycles based on amounts of frost detected on one or more objects (e.g., on fins and/or coils of an evaporator of a blast cell). A defrost control unit can analyze images of the object(s) to determine the amount of frost that has formed on the object(s). The defrost control unit can initiate a defrost cycle when at least a threshold amount of frost is determined to have formed on the object(s) or at least a threshold number (or percentage) of the objects have at least a threshold amount of frost on the objects.

As used in the document, the term "frost" refers to frost, ice, and/or other forms of frozen or partially frozen water that can form on objects. Although the example systems and techniques are described largely in terms of components of a blast cell, the systems and techniques can also be used to initiate and control defrost cycles in different contexts.

Figure 1:
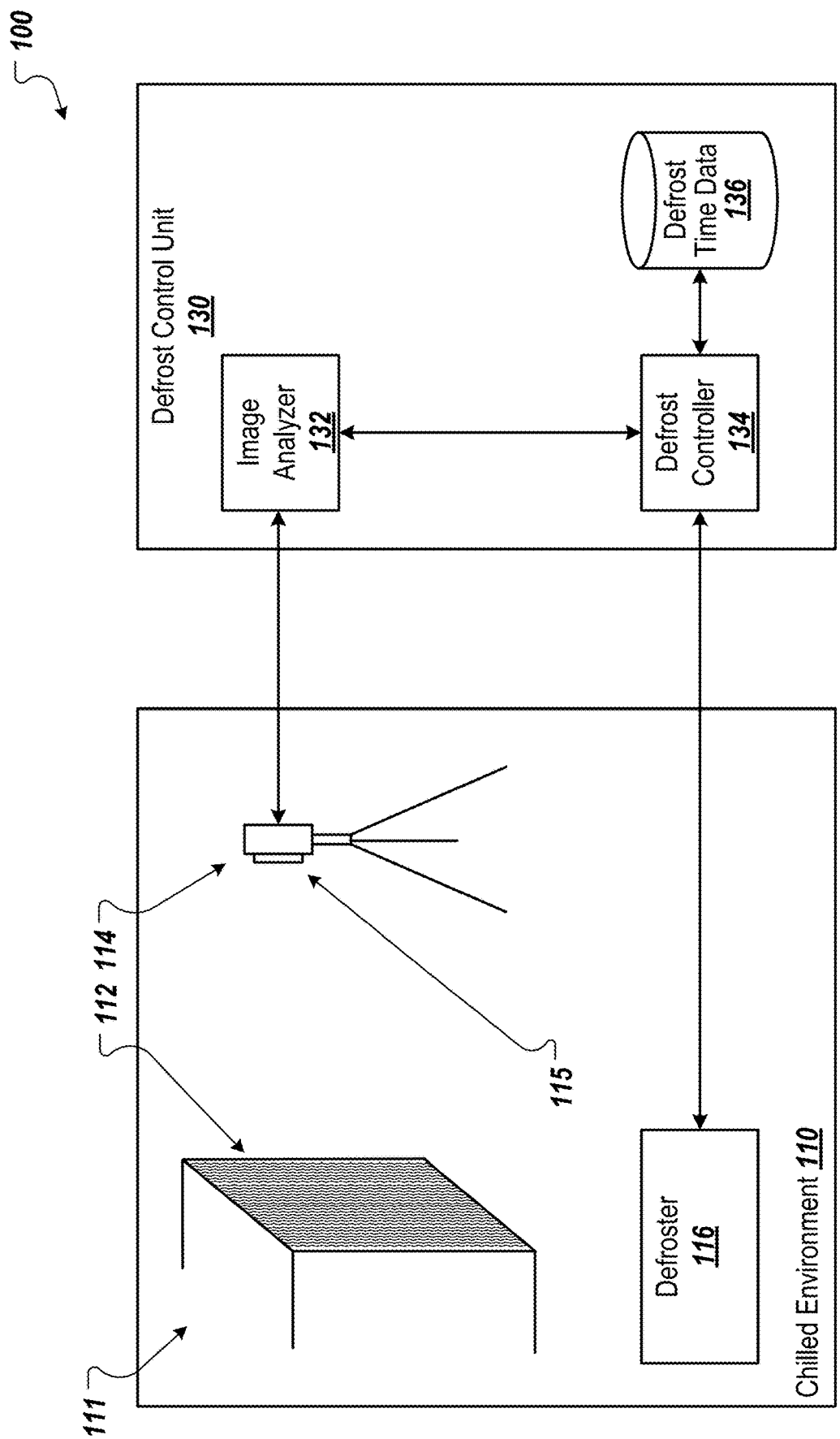
FIG. 1 is an example environment in which a defrost control unit initiates and controls defrost cycles for objects in a chilled environment.

FIG. 1 is an example environment 100 in which a defrost control unit 130 initiates and controls defrost cycles for objects in a chilled environment 110. The chilled environment 110 includes one or more blast cells 111 that keep the chilled environment 110 at or below a particular temperature (e.g., at or below the freezing point of water). Each blast cell 111 includes an evaporator coil (not shown) and fins 112. The evaporator coil can be made of aluminum, steel, or another appropriate metal of other appropriate material that conducts heat easily. The blast cell(s) 111 can blast freeze items, e.g., foodstuffs, and keep the items frozen using periodic blast freeze cycles.

The evaporator coil can be in the form of U-shaped tubes that are installed in a panel. The fins 112 are thin heat conducting metal (e.g., aluminum or steel) strips that line the outside of the panels. During a blast freeze cycle, a compressor pulls cold liquid refrigerant through the evaporator coil. As the refrigerant flows, one or more fans can draw warmer air from the chilled environment 110 over the evaporator coil. The refrigerant absorbs heat from the passing air and removes it from the chilled environment 110. The fins 112 can improve the efficiency of the evaporator by pulling the air closer to the evaporator coil and facilitating heat transfer from the environment 110 to the refrigerant. Any suitable refrigerant may be selected, such as an HCFC, HFC, or HFO.

If there is moisture in the air in the chilled environment 110, this moisture will also deposit on anything colder than the air, including the fins 112 and the evaporator coil. As the temperature in the chilled environment 110 is below the freezing point of water, these moisture deposits become frost. Frost formations on the fins 112 and evaporator coil can insulate the evaporator coil, reducing the amount of heat transfer between the air in the chilled environment 110 and the coil, thereby reducing the efficiency of the blast cell 111. For example, frost formations on the fins 112 can block the air from flowing to the evaporator coil. This can be particularly problematic for chilled environments for freezing foodstuffs as many foodstuffs include significant levels of moisture.

The chilled environment 110 includes a defroster 116 that can remove frost from the evaporator coil, fins 112, and/or other components of the blast cell 111, e.g., by running a warm or hot defrost agent (e.g., ammonia or another appropriate gas or liquid defrost agent) through the evaporator coil. For example, the defrost agent can be a heated cooler agent, such as ammonia gas, that is run through the coils to heat up the ice that developed on the coil and fins 112. The ammonia heats the coil and fins 112, causing the frost that has formed on the coil and fins to melt and fall from the coil and fins 112. To do so, the refrigerant has to be evacuated from the evaporator coil and the defrost agent has to be routed to the evaporator coil, which can be a time consuming process.

By running the defrost agent through the coils, the defroster 116 introduces heat into the chilled environment 110 that will need to be removed to ensure effective blast freezing can be performed and to keep items (e.g., foodstuffs) in the chilled environment 110 frozen. This can consume a significant amount of energy and other resources (e.g., water). This can also stall the times for a blast freeze cycle, which can effectively add a significant amount of time to a subsequent blast cycle, e.g., 1-3 additional hours for the subsequent blast cycle. Thus, it is important to ensure that defrost cycles are only performed when necessary to remove frost from the components of the blast cell 111.

Absent the techniques described herein, defrost cycles may be performed too frequently (resulting in wasted resources, wasted energy, and potential decaying of foodstuffs due to thawing) or too infrequently (resulting in inefficient operation of the blast cell 111 and/or damage to blast cell components). In addition, if a defrost cycle occurs during a product blast cycle, the defrost interferes with the total blast freeze time resulting in a significant increase (e.g., 1-3 hours or more) in the total blast time for the product. Aggregated over many blast cells in each facility and across many facilities, the techniques described herein can result in a significant reduction in the amount of wasted energy, water, and other resources.

The defrost control unit 130 can selectively initiate and control defrost cycles performed by the defroster 116. A defrost cycle can include running a defrost agent through the evaporator coil for a period of time to remove frost from the components (e.g., evaporator coil and/or fins 112) of the blast cell 111. The defrost control unit 130 can determine when to initiate a defrost cycle based on the amount of frost that has formed on the components. For example, the defrost control unit 130 can initiate defrost cycles when it determines that at least threshold amount of frost has formed on the fins 112 or evaporator coil. In another example, the defrost control unit 130 can initiate defrost cycles when it determines that at least a threshold number (or percentage) of fins 112 have at least a threshold amount of frost formed on them. Generally, any suitable metric for quantifying the amount of frost that has formed on the fins 112 (and/or other objects in the chilled environment 110) may be employed to determine when to initiate a defrost cycle, such as a weight or volume of the frost formation, a percentage or portion of surface area on the fins 112 or objects that have at least a threshold amount of frost formation, a percentage or portion of objects that have at least a threshold amount of frost formation, or a combination of these and/or other metrics. Any of the metrics may be compared to a corresponding threshold, such that a defrost cycle is initiated when the metric meets or exceeds the threshold.

In one example, the threshold amount of frost (or, e.g., the number or percentage of fins 112) can be specified based on an amount of frost that would reduce the efficiency of the blast cell to an unacceptable level. For example, a blast cell operator can specify the threshold based on monitored performance or expected performance of the blast cell when the threshold amount of frost has formed on the fins 112 and/or coil. In another example, the threshold amount of frost can be specified based on the type of items being frozen or kept frozen in the in the chilled environment 110. For example, strawberries introduce different moisture content into the air than squid. In another example, the back pressure of refrigerant (e.g., anhydrous ammonia) in the system can be monitored and the threshold based in part on the refrigerant pressure. In another example, the temperature and humidity of the intake side and rear exit of the evaporator coils can be monitored, and the threshold set based in part on these signals. The change in temperature and/or humidity across the coils can be used to facilitate interpretation of the images.

The defrost control unit 130 includes an image analyzer 132, a defrost controller 134, and a defrost time data storage unit 136. The defrost control unit 130 can be implemented as one or more computers in one or more locations. The image analyzer 132 is configured to quantify the amount of frost that has formed on objects (e.g., the fins 112 and/or evaporator coil) based on an analysis of one or more images of the objects received from a camera 114.

The camera 114 can capture images of the objects and provide the images to the defrost control unit 130. In this example, the camera 114 is located in the chilled environment 110. Being in the chilled environment 110, moisture and frost can form on the lens of the camera 114. To prevent such frost formations from the moisture, the camera 114 can include a heated lens that melts the frost from the lens. In other example, the camera 114 can be located outside the chilled environment 110. For example, the camera 114 can capture images of the objects through a transparent window between the chilled environment 110 and an area in which the camera 114 is installed.

In some implementations, the camera 114 is configured to detect light reflecting from the objects within a particular range of wavelengths that are selected so as to improve sensitivity for frost detection based on a difference in the corresponding reflectivities of frost (e.g., ice) and the surfaces of the objects (e.g., evaporator fins 112) being maximized within the range of wavelengths of the camera 114. For example, the particular wavelength range can be a range within the infrared wavelength range, which extends from 700 nanometers (nm) to 1 millimeter (mm), and the camera 114 can be an infrared camera. The camera 114 can convert the data into a digital image that shows the amount of light reflected from each part of the objects.

In another example, the camera 114 can be configured to detect light within a more narrow wavelength range within the infrared wavelength range. As described in more detail below, the difference in the reflectivity of light between (i) aluminum and steel (e.g., the surface material of the fins 112 and/or evaporator coil) and (ii) frost is significantly greater for light within a particular wavelength range that is near 3 micrometers ($\mu m$) (e.g., about 2 $\mu m$ to about 4 $\mu m$, or about 2.8 $\mu m$ to 3.2 $\mu m$) than other wavelength ranges. Thus, detecting light in this particular wavelength range improves the ability of the image analyzer 132 to distinguish between areas of the surface of the fins 112 and/or evaporator coil that is covered with frost and areas that are not covered with frost.

To configure the camera 114 to detect light within the more narrow bandwidth, the camera 114 can include a bandpass filter that passes light within the more narrow bandwidth. For example, the bandpass filter can pass light within a particular wavelength range that is near 3 $\mu m$ and block light that is outside of that range. The bandpass filter can be placed over the lens of the camera. An infrared light in the chilled environment 110 can direct light at an object and the camera 114 can detect light that reflects from the object and passes through the bandpass filter. In another example, a flood light that produces light within a given wavelength range that includes the narrow bandwidth near 3 $\mu m$ could be used to reflect light from the object.

The camera 114 can include an optical system that focuses infrared light (or light in a more narrow wavelength range) onto a special detector chip (e.g., a sensor array) that includes detector pixels arranged in a grid. Each pixel in the sensor array reacts to the light focused on it and produces an electronic signal. A processor of the camera 114 takes the signal from each pixel and creates a color map of the amount of light reflected from the various areas of the object(s). Each amount of light value is assigned a different color (e.g., within the visible spectrum that is visible by humans). For example, an area for which more light is detected may be assigned a blue color (or another appropriate color) and an area for which less light is detected can be assigned a yellow color (or another appropriate color different from the color assigned for more light). The shades of these colors can also vary based on the amount of light detected. The camera 114 can generate an electronic image that represents the color map and send the image to the defrost control unit 130.

In some implementations, the camera 114 can blend this image generated based on infrared light into an image of the object(s) captured by a visible light camera (not shown, but could be part of the camera 114). For example, a visible light camera can capture a visible light image of the fins 112 and the camera 114 (or the image analyzer 132) can blend the colors that represent the amount of infrared light reflected from the fins 112 with the visual depiction of the fins 112. In this way, the image analyzer 132 can analyze each fin 112 individually.

The image analyzer 132 can analyze the color map to quantify an amount of frost formation on the object(s). For example, the image analyzer 132 can determine the amount of the image that is a color that corresponds to frost. In a particular example, as described below, frost may be much less reflective than aluminum or steel for a particular range of wavelengths of light. The camera 114 or a post-processing system can assign the areas of the image for which less light was detected the color that corresponds to less light (e.g., yellow). In this example, the image analyzer 132 can analyze the image to determine how much of the image is yellow (e.g., the number of pixels of the image that depicts a yellow color). If the image depicts more than just the object(s) being monitored, the image analyzer 132 can determine the amount of the portion of the image that depicts the object is yellow, without considering the color of portions of the image that do not depict the object.

The image analyzer 132 can use the amount of the image that includes the color that corresponds to frost as a proxy for the amount of frost formed on the object(s). For example, the image analyzer 132 can compare the amount of the image that includes the color for frost to a threshold to determine whether to initiate a defrost cycle. In another example, the image analyzer 132 can determine an amount of frost using a mathematical function that defines the amount of frost that corresponds to the amount of the image that includes the color for frost.

The image analyzer 132 can also consider the various shades of the colors when determining the amount of frost on the object(s). For example, a brighter yellow may correspond to more frost (e.g., less light detected) and a duller yellow may correspond to less frost (e.g., more light detected but less light than would be from aluminum or steel). In this example, the image analyzer 132 can determine the amount of frost formed on the objects by assigning a greater amount of frost to areas (e.g., pixels) of the image that includes a brighter yellow and less frost to areas of the image that includes a duller yellow (e.g., proportionally based on brightness level). The image analyzer 132 can then determine the overall amount of frost based on a combination of (e.g., sum of) the amount of frost assigned to each area (e.g., pixel) of the image.

In some implementations, the image analyzer 132 can determine a value that represents the amount of frost formed on each individual fin 112 based on the color assigned to portions of the fin 112, in a similar manner as determining the amount of frost on an object. For example, the image analyzer 132 can assign an amount of frost to each pixel of the image that depicts the fin 112 based on the color depicted by each pixel. The image analyzer 132 can then determine a total amount of frost formed on the fin 112 based on the amounts assigned to each pixel (e.g., a sum of the amounts). The image analyzer 132 can then determine, for each individual fin 112, whether there is at least a threshold amount of frost formed on the fin 112 based on the total amount of frost determined for the fin 112.

The image analyzer 132 can provide, to the defrost controller 134, data specifying the amount of frost formed on the object(s) and/or the amount of frost formed on each individual fin 112. The defrost controller 134 can determine whether to initiate the defrost cycle 134 based on the received data. For example, the defrost controller 134 can compare the amount of frost formed on the object(s) to a threshold amount. If the amount meets or exceeds the threshold, the defrost controller 134 can determine to initiate the defrost cycle.

In another example, the defrost controller 134 can determine, for each individual fin 112, whether the amount of frost formed on the fin 112 meets or exceeds a threshold amount. The defrost controller 134 can then determine a quantity of the fins 112 for which the amount of frost meets or exceeds the threshold amount. The defrost controller 134 can then compare this quantity of fins to a threshold number of fins. If the quantity of fins meets or exceeds the threshold number of fins, the defrost controller 134 can determine to initiate the defrost cycle.

In some implementations, the defrost controller 134 maintains data indicating information about an accumulated amount of frost formation on the one or more objects, and updates the accumulated amount of frost formation each time an image of a sequence of images of the object(s) is received. For example, the image analyzer 132 can determine one or more metrics representing an initial amount of frost formation in a first image of the object(s). The image analyzer 132 can provide an indication of the initial amount of frost (e.g., the one or more metrics) to the defrost controller 134 and the defrost controller 134 can store the initial amount as the accumulated amount.

When a second image of the object(s) is received, the image analyzer 132 can compare the second image to the first image to determine a difference in the amount of frost between the two images. The image analyzer 132 can provide the difference to the defrost controller 134. The defrost controller 134 can add the difference to the stored accumulated amount to determine an updated accumulated amount of frost. The image analyzer 132 and the defrost controller 134 can update the accumulated amount of frost for each image. The defrost controller 134 can compare the accumulated amount of frost to the threshold after each image until the accumulated amount of frost meets or exceeds the threshold. When the accumulated amount of frost meets or exceeds the threshold, the defrost controller 134 can initiate the defrost cycle. The defrost controller 134 can also reset the accumulated amount of frost (e.g., to zero) before receiving images after the defrost cycle is completed. In this way, the defrost control unit 130 does not have to store the images or the amount of frost detected in each image, freeing up memory resources for other processes and data.

In some implementations, the defrost controller 134 also considers the change in temperature and/or humidity of the refrigerant as it passes through the coils to determine whether to initiate a defrost cycle. For example, the blast cell 111 can include one or more humidity sensors and one or more temperature sensors on the front side of the coils where the refrigerant enters the coils. These sensors can measure the intake humidity and intake temperature of the refrigerant. The blast cell 111 can also include one or more humidity sensors and one or more temperature sensors on the back side of the coils where the refrigerant exits the coils. These sensors can measure the exit humidity and exit temperature of the refrigerant. The defrost controller 134 can receive the measurements and determine a difference between the intake humidity and the exit humidity and a difference between the intake temperature and the exit temperature.

The defrost controller 134 can use this humidity difference and/or temperature difference to determine when to initiate a defrost cycle. For example, the temperature and moisture content of the refrigerant is expected to increase as it passes through the coils and picks up heat from the chilled environment 110. If the humidity difference and/or temperature difference drops over time, this indicates that frost is building up on the coils. The defrost controller 134 can use the humidity difference, the temperature difference, and/or the amount of frost determined to have formed on the fins 112 and/or the evaporator coil using the image(s) to determine when to initiate a defrost cycle.

For example, if the amount of frost exceeds a threshold (e.g., the quantity of the fins on which at least the threshold amount of frost has accumulated meets or exceeds a threshold quantity of fins), the temperature difference is less than a threshold, and/or the humidity difference is less than a threshold, the defrost controller 134 can initiate a defrost cycle.

In some implementations, the defrost controller 134 also considers the amount of back pressure developed by the ammonia (or another appropriate gas or liquid defrost agent) in the pipes of the evaporator coil. If the amount of frost exceeds a threshold and the back pressure exceeds a threshold, the defrost controller 134 can determine to initiate a defrost cycle. Similarly, the defrost controller 134 can use this information in combination with the temperature and humidity measurements. For example, the defrost controller 134 can initiate a defrost cycle when the amount of frost exceeds a first threshold (e.g., a quantity of the fins on which at least the threshold amount of frost has accumulated meets or exceeds a first threshold quantity of fins), the temperature difference is less than a second threshold, the humidity difference is less than a third threshold, and the amount of back pressure exceeds a fourth threshold. In another example, a voting technique can be used, e.g., the defrost controller 134 can initiate a defrost cycle when at least two or at least three of the thresholds are exceeded.

In some implementations, the defrost controller 134 considers changes in the temperature difference and/or changes in the humidity difference in determining when to initiate a defrost cycle. For example, if the temperature difference drops by more than a threshold amount during a time period or the humidity difference drops by more than a threshold amount during the time period, the defrost controller 134 can initiate a defrost cycle. This information can be used along with the other information, e.g., using a voting technique as described above.

In some implementations, the defrost controller 134 determines whether to initiate a defrost cycle based on whether a blast freeze cycle is being performed or if a blast freeze is scheduled to be performed soon (e.g., prior to the defrost cycle being completed). The blast cell 111 cannot perform both a blast freeze cycle and a defrost cycle at the same time. If the defrost controller 134 determines that a defrost cycle should be performed based on the amount of frost, the defrost controller 134 can access a blast freeze cycle schedule and ensure that a blast freeze cycle is not currently being performed and to determine whether the defrost cycle would be completed before the next blast freeze cycle (e.g., by comparing the duration of the defrost cycle to the duration of time before the next blast freeze cycle). If so, the defrost controller 134 can initiate the defrost cycle. If not, the defrost controller 134 can wait until the blast freeze cycle is completed and then initiate the defrost cycle. In another example, the defrost controller 134 can communicate with a blast freeze cycle controller (not shown) to cause the blast freeze cycle controller to delay the next blast freeze cycle until the defrost cycle is completed. In this way, the blast freeze cycle can be performed after the defrost cycle to remove the heat introduced into the chilled environment 110 by the defroster 116. Similarly, the freeze cycle controller can prevent a blast freeze cycle from being performed when a defrost cycle is being performed.

If the defrost controller 134 determines to initiate the defrost cycle, the defrost controller 134 can initiate the defrost cycle by sending a defrost control signal to the defroster 116. In some implementations, the defrost controller 134 also sends data to the defroster 116 specifying a duration of time for the defrost, e.g., obtained from the defrost time data storage unit 136. The duration of time can be based on durations of time taken by the defroster 116 to remove the frost from the object (e.g., the fins 112 and/or evaporator coil). For example, the defrost controller 134 can monitor the amount of frost on the objects during each defrost cycle based on images received from the camera 114 and analyzed by the image analyzer 132. The defrost controller 134 can determine an average duration of time taken for the frost to be removed and use the average duration of time for future defrost cycles. In other examples, an operator can specify the defrost time for the defrost cycles.

Figure 2:
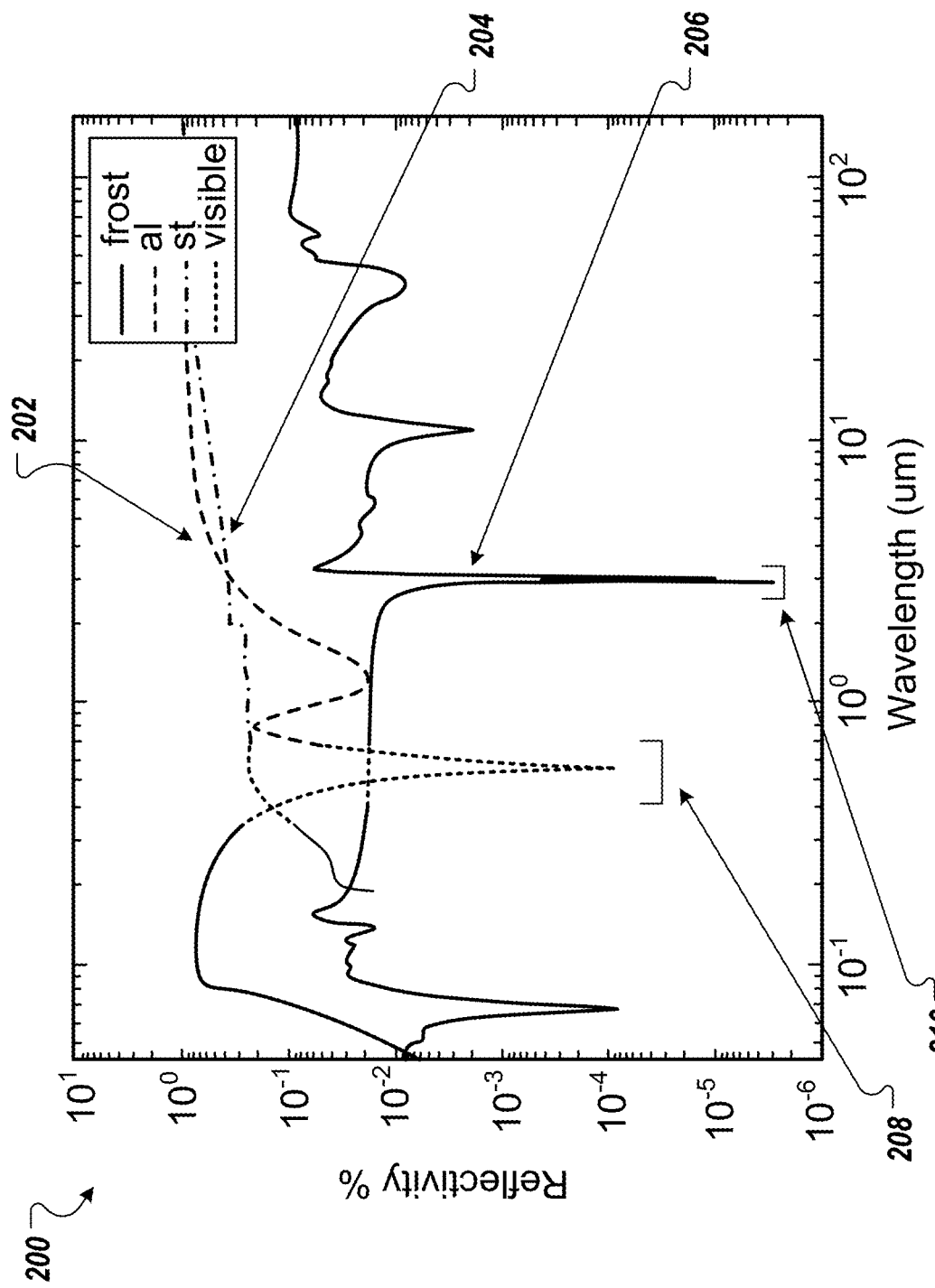
FIG. 2 is a graph that depicts the reflectivity of ice and metal surfaces for different wavelengths of light.

FIG. 2 is a graph 200 that depicts the reflectivity of ice and metal surfaces for different wavelengths of light. In particular, the graph 200 shows the reflectivity of ice, aluminum, and steel for various wavelengths of light. A first line 202 shows the reflectivity of aluminum for the various wavelengths. A second line 204 shows the reflectivity of steel for the various wavelengths. A third line 206 shows the reflectivity of frost for the various wavelengths.

A first range of wavelengths 208 represents the visible range of wavelengths of light that is visible by humans. A second range of wavelengths 210 represents a range of wavelengths for which the reflectivity of frost is substantially less than the reflectivity of both steel and aluminum. This range of wavelengths is between 2 µm and 3 µm (e.g., about 2.8-3.2 µm). As the surface of evaporator coils and fins are commonly made from steel or aluminum, images captured by cameras configured to detect light within the second range of wavelengths 210 enables the image analyzer 132 of FIG. 1 to more readily distinguish between frost formations on the blast cell components (e.g., fins and coils) and the components themselves. Thus, the camera 114 of FIG. 1 can be configured to detect light in the second range of wavelengths 210, as described above.

Figure 3:
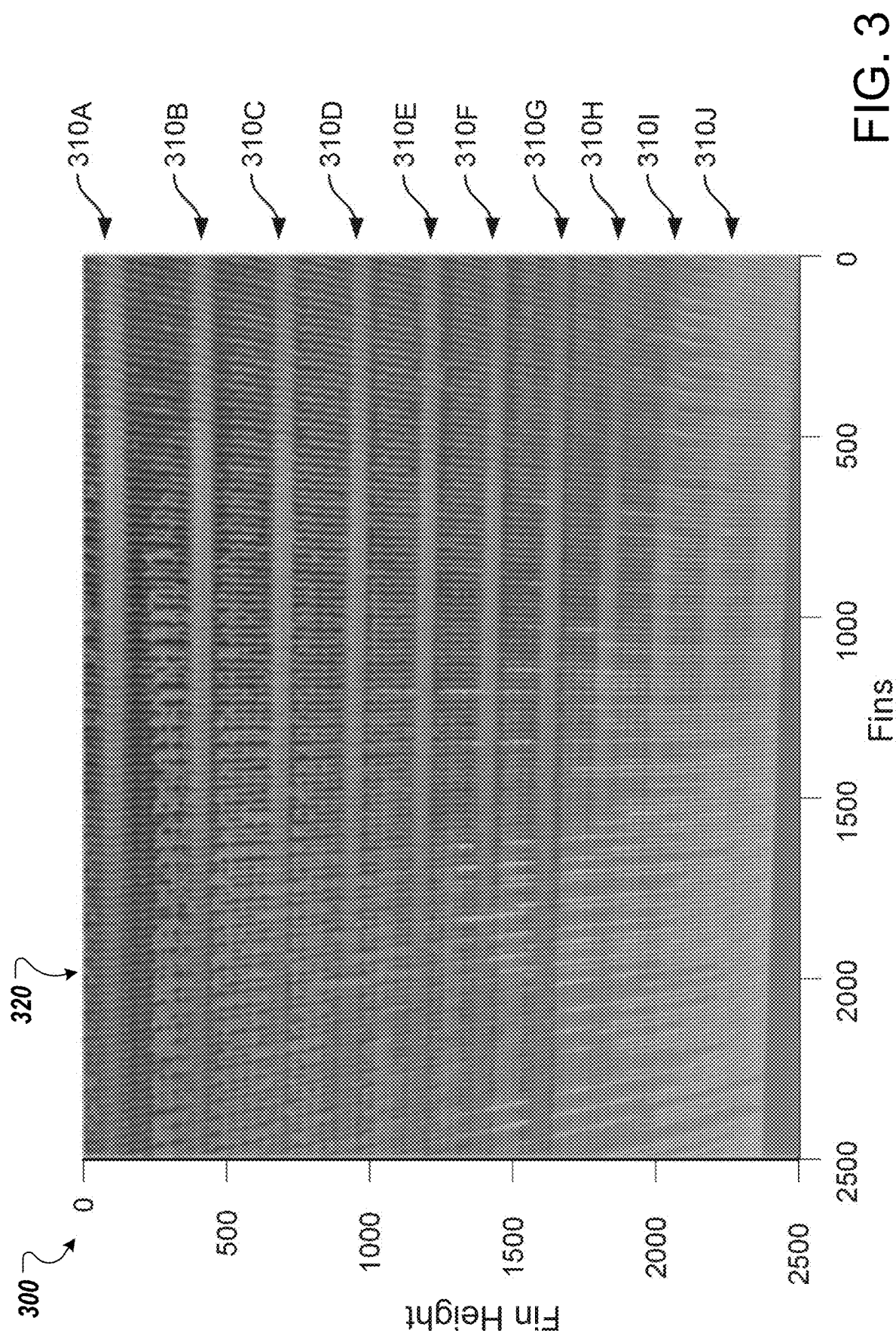
FIG. 3 is a graph that depicts the amount of light detected by a camera from fins of an evaporator.

FIG. 3 is a graph 300 that depicts the amount of light detected by a camera from fins of an evaporator. The graph 300 represents an image of vertical fins 320 and portions 310A-310J of an evaporator coil, along with the amount of light detected from the various portions of the fins and on the coil portions 310A-310J. For example, the graph 300 can represent a visual light image of the fins 320 and coil portions 310A-310J merged with a color-coded image that represents the amount of light detected from each part of the fins 320 and coil portions 310A-310J.

The different colors are represented by different shades of grey in FIG. 3. In this example, the lighter shades of grey (e.g., near the bottom of the graph 300) represent less detected light and the darker shades represent more detected light. Thus, the lighter shade can represent frost formation and the darker shades can represent uncovered aluminum or steel of the surface of the fins 320 and the coil portions 310A-310J. For example, a camera that is configured to detect light with wavelengths in the second wavelength range 210 of FIG. 2 would detect more light from aluminum or steel based on its higher reflectivity than from frost based on its lower reflectivity of light in the wavelength range 210 of FIG. 2.

Figure 4:
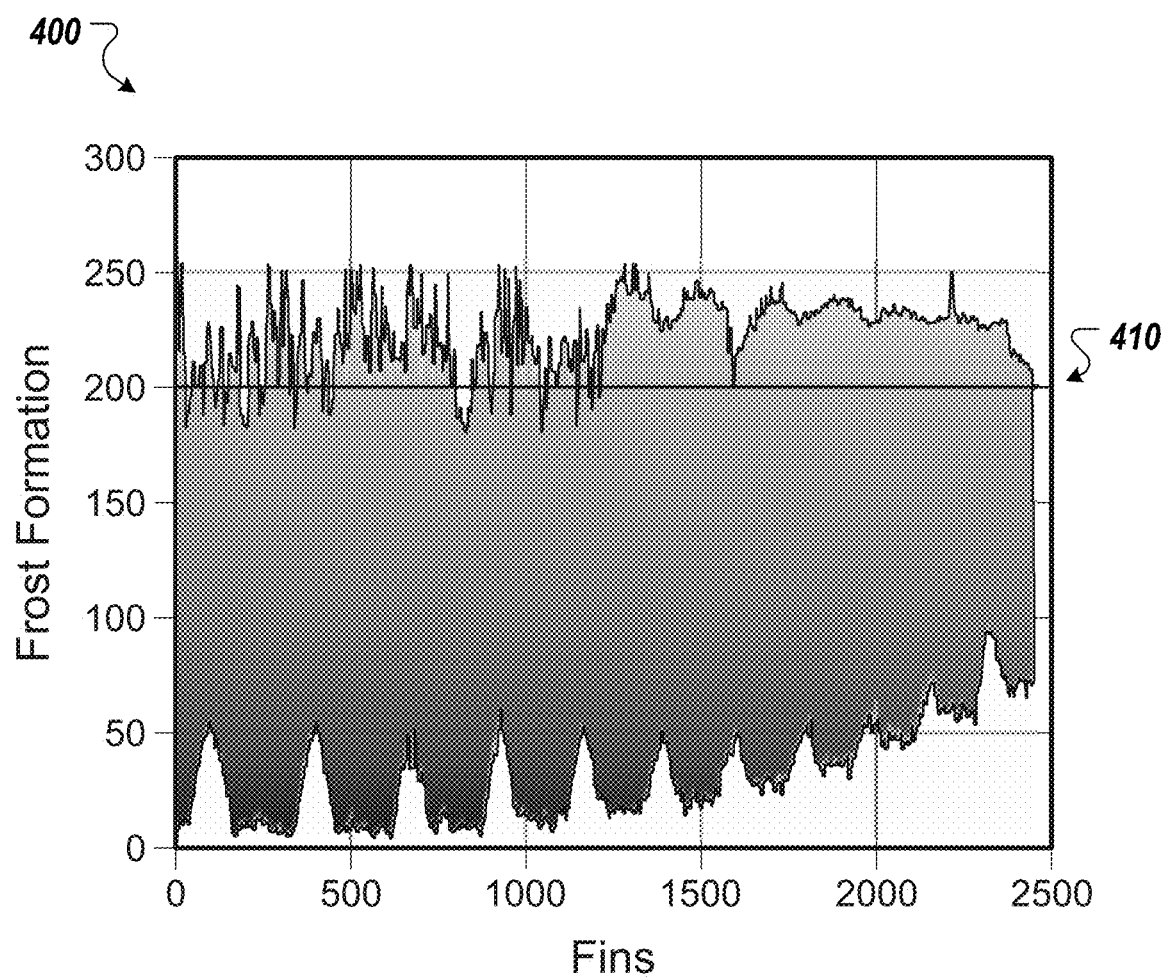
FIG. 4 is a graph that depicts an amount of frost that has formed on fins of an evaporator.

FIG. 4 is a graph 400 that depicts an amount of frost that has formed on fins of an evaporator. The graph 400 can represent the same fins as those shown in FIG. 3. In this graph, lighter shades of grey represent frost and darker shades of grey represent lack of frost on the fins. The height of the lighter shades of grey along the top of the graph 400 represents the amount of frost detected on the fin represented by that portion of the graph 400. That is, the y-axis defines the range of shades that correspond to the amount of frost with the lightest shade being at the top (representing more frost) and the darkest shade being at the bottom (representing no frost). The numbers along the y-axis correspond to the shades of grey, e.g., 300 can correspond to the lightest shade of grey and zero can correspond to the darkest shade of grey. In other examples, shades of colors can be used to represent the amount of frost and the y-axis can define the color range that represents the amount of frost. The numbers along the x-axis represent the pixel numbers of the image.

The graph 400 also illustrates a threshold amount of frost 410 for each fin. In this example the threshold amount of frost is 200. If at least a threshold number (or percentage) of the fins have at least an amount of frost on the fin that equals 200 (e.g., that extends above 200 in the graph 400), the defrost control unit 130 of FIG. 1 can initiate a defrost cycle.

Figure 5:
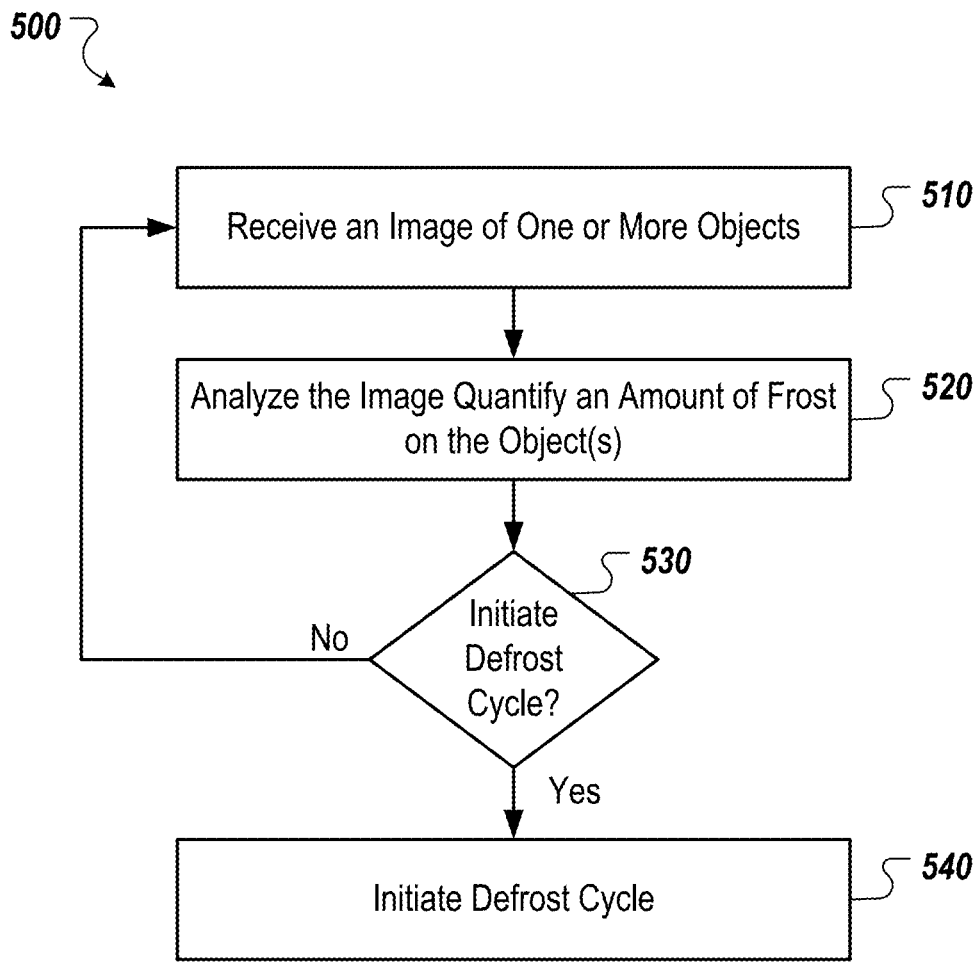
FIG. 5 is a flow diagram of an example process for initiating a defrost cycle.

FIG. 5 is a flow diagram of an example process 500 for initiating a defrost cycle. Operations of the process 500 can be performed, for example, by one or more data processing apparatus, such as the defrost control unit 130 of FIG. 1. Operations of the process 500 can also be implemented as instructions stored on a non-transitory computer readable medium. Execution of the instructions cause one or more data processing apparatus to perform operations of the process 500.

An image of one or more objects is received (510). The image can be received from a camera, e.g., a camera located in a chilled environment with the one or more objects. The one or more objects can include components of a blast cell. For example, the one or more objects can include one or more evaporator coils and/or fins for the evaporator coil(s). As described above, the camera can be configured to detect light within a particular range of wavelengths in which the reflectivity of frost is substantially different from the reflectivity of the surface of the one or more objects. If the surface of the objects is aluminum or steel, the range of wavelengths can be within 2-4 µm, which is within the infrared wavelength spectrum.

The image is analyzed to quantify the amount of frost formation on the one or more objects (520). For example, as described above, the amount of frost formation at each area of the surface of the object(s) can be determined based on the amount of light detected by the camera from that area of the object(s). In this example, a digital image provided by the camera can include a first color (or various shades of the first color) for areas of the image for which more light was detected (e.g., representing little or no frost) and a second color (or various shades of the second color) for areas of the image for which less light was detected (e.g., representing more frost).

The total amount of frost formation on the one or more objects can be determined by determining a sum of the amounts for each area. For example, the image can be analyzed to determine the number of pixels that depict the second color). Various shades of the second color can indicate different amounts of frost. For example, the amount of frost an individual pixel contributes to the total amount of frost can be based on the shade of the second color depicted by that pixel. In some implementations, the image is analyzed to quantify the amount of frost on each individual object of a set of objects (e.g., on each fin of a set of fins).

A determination is made whether to initiate a defrost cycle (530). The determination can be made based on the amount of frost formation on the object(s), the humidity of a chilled environment in which the object(s) are located, and/or a blast freeze cycle schedule for a blast cell that cools the child environment. For example, the amount of frost formation on the object(s) can be compared to a threshold amount of frost formation.

In another example, the amount of frost formation on each individual object of a set of objects is compared to a threshold. Then, the quantity of objects for which the amount of frost meets or exceeds the threshold is determined.

If the amount of frost formation on the object(s) meets or exceeds the threshold (or the quantity of objects meets or exceeds the threshold), a determination can be made that a defrost cycle should be performed. If no blast freeze cycle is scheduled to start prior to the defrost cycle completing, the determination can be to initiate the defrost cycle. If a blast freeze cycle is scheduled to start prior to the completion of the defrost cycle, the defrost cycle can be delayed until the blast freeze cycle is completed. If the amount of frost does not meet or exceed the threshold amount of frost, the determination can be made to not initiate the defrost cycle.

If the determination is to not initiate the defrost cycle, the process 500 returns to operation 510 and another image is received and analyzed. If the determination is to initiate the defrost cycle, the defrost cycle is initiated (540). For example, a defrost control signal can be sent to a defroster to initiate the defrost cycle. The defroster can be configured to perform the defrost cycle in response to receiving the defrost control signal.

As described above, the defrost cycle can be performed for a specified duration of time. In this example, the defrost control signal can specify the duration of time. In another example the defroster can be configured to perform the defrost cycle for the duration of time each time the defroster received the defrost control signal.

Additionally and/or alternatively, the duration of the defrost cycle 540 can be dynamic and based on repeatedly performing the steps 510-530 while the defrost cycle is being performed. For example, the defrost cycle 540 can be initiated and then, at regular intervals (e.g., every second, every 15 seconds, every 30 seconds, every minute, every 2 minutes, every 5 minutes) steps 510-530 can be performed to determine when the one or more objects are free of frost. Once it is determined that the one or more objects do not contain frost (or contain less than a threshold amount of frost), then the defrost cycle 540 can be terminated and normal operation of the cooling equipment can resume. The frost threshold to initiate the defrost cycle at 530 and the threshold to terminate the defrost cycle (not depicted) may be the same or they may be different. For instance, cooling equipment may still operate (transfer heat) efficiently with some frost but, once significant amounts of frost or ice have accumulated, the efficiency may plummet. To avoid initiating defrost cycles every time a small amount of frost is detected, which may introduce other inefficiencies by injecting heat into the overall system during the defrost cycle, the frost threshold may be set higher than the defrost threshold, which may aim to eliminate all frost from the one or more objects.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. Other programming paradigms can be used, e.g., functional programming, logical programming, or other programming. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system for controlling defrost of a chilled environment, comprising:
   an infrared camera that is configured to capture images of one or more objects located in the chilled environment by detecting light within a particular range of wavelengths within an infrared wavelength spectrum; and
   a defrost control unit configured to:
      receive an image of the one or more objects from the infrared camera;
      analyze the image of the one or more objects to quantify an amount of frost formation on the one or more objects, wherein quantifying the amount of frost formation on the one or more objects includes analyzing a brightness level of light reflected off the one or more objects in the infrared wavelength spectrum and inversely proportionally correlating the amount of frost formation to the brightness level of the one or more objects as a result of frost being less reflective in the particular infrared wavelength spectrum than the one or more objects without frost, such that a low brightness level of the one or more objects in the image correlates to a high amount of frost formation and a high brightness level of the one or more objects in the image correlates to a low amount of frost formation, the low brightness level being lower than the high brightness level and the high amount of frost formation being greater than the low amount of frost formation;
      determine when to initiate a defrost cycle in the chilled environment based on the amount of frost formation on the one or more objects; and
      in response to determining to initiate the defrost cycle, initiating the defrost cycle by sending a defrost control signal to a defroster, wherein the defroster is configured to perform the defrost cycle within the chilled environment in response to receiving the defrost control signal.

2. The system of claim 1, wherein the infrared camera is located in the chilled environment and includes a heated lens.

3. The system of claim 1, wherein, when a surface of an evaporator is covered with frost or ice, the light within the particular range of wavelengths reflects off the surface differently than when the surface is not covered with frost or ice.

4. The system of claim 3, wherein the particular range of wavelengths within the infrared wavelength spectrum is from a first wavelength that is greater than or equal to 2.8 micrometers to a second wavelength that is less than or equal to 3.2 micrometers.

5. The system of claim 1, wherein the defrost control unit is further configured to set a duration of time for which the defrost cycle is to be performed based on previous durations of time taken by the defroster to remove frost formation from the one or more objects.

6. The system of claim 1, wherein the defrost control unit is further configured to cause the defroster to perform the defrost cycle until less than or equal to a threshold amount of frost is detected on the one or more objects.

7. The system of claim 6, wherein the defrost control unit being configured to cause the defroster to perform the defrost cycle until less than or equal to the threshold amount of frost is detected on the one or more objects includes:
   repeatedly performing the following during the defrost cycle until less than or equal to the threshold amount of frost is detected on the one or more objects:
      receive an additional image of the one or more objects from the infrared camera;
      analyze the additional image of the one or more objects to quantify an amount of remaining frost on the one or more objects; and
      determine whether the amount of remaining frost on the one or more objects is less than or equal to the threshold amount of frost; and
   in response to determining that the amount of remaining frost on the one or more objects is less than or equal to the threshold amount of frost, stopping the defrost cycle.

8. The system of claim 7, wherein the threshold amount of frost is no frost on the one or more objects.

9. The system of claim 7, wherein the threshold amount of frost is less than a second threshold amount of frost that is used to determine when to initiate the defrost cycle.

10. The system of claim 7, wherein during the defrost cycle the receive the additional image, the analyze the additional image, and the determine whether the amount of remaining front is less than or equal to the threshold amount of frost operations are performed at a repeated time interval until less than or equal to the threshold amount of frost is detected on the one or more objects.

11. The system of claim 1, wherein:
the one or more objects comprise an evaporator that has evaporator coils and fins;
the defrost control unit is further configured to quantify the amount of frost formation on the one or more objects by determining, based on analysis of one or more images of the one or more objects captured by the infrared camera, a quantity of the fins on which at least a threshold amount of frost has accumulated; and
the defrost control unit is further configured to initiate the defrost cycle in the chilled environment in response to identifying that the quantity of the fins on which at least the threshold amount of frost has accumulated meets or exceeds a threshold quantity of fins.

12. The system of claim 11, wherein the defrost control unit determines when to initiate the defrost cycle in the chilled environment based further on at least one of:
(i) a difference in temperature between an intake side of the evaporator coils and a rear exit of the evaporator coils; or
(ii) a difference in humidity between the intake side of the evaporator coils and the rear exit of the evaporator coils.

13. The system of claim 11, wherein the defrost control unit is further configured to determine when to initiate the defrost cycle in the chilled environment based further on an amount of back pressure in the evaporator coils developed by a defrost agent.

14. A system for controlling defrost of a chilled environment, comprising:
a camera configured to capture images of one or more objects located in the chilled environment; and
a defrost control unit configured to:
receive an image of the one or more objects from the camera;
analyze the image of the one or more objects to quantify an amount of frost formation on the one or more objects;
obtain data that indicates an accumulated amount of frost formation on the one or more objects based on an amount of frost formation detected in a sequence of previous images of the one or more objects;
determine a difference between the amount of frost formation detected on the one or more objects in the image and an amount of frost formation detected on the one or more objects in a previous image;
update the data that indicates the accumulated amount of frost formation based on the difference;
determine when to initiate a defrost cycle in the chilled environment based on the amount of frost formation on the one or more objects; and
in response to determining to initiate the defrost cycle, initiating the defrost cycle by sending a defrost control signal to a defroster, wherein the defroster is configured to perform the defrost cycle within the chilled environment in response to receiving the defrost control signal.

15. The system of claim 14, wherein the defrost control unit is further configured to initiate the defrost cycle in the chilled environment in response to identifying that the accumulated amount, indicated by the data that has been updated, meets or exceeds a threshold amount of frost formation.

16. The system of claim 1, wherein analyzing the image of the one or more objects to quantify the amount of frost formation on the one or more objects comprises distinguishing a depiction of frost on the one or more objects from a depiction of the objects themselves, based on a difference in reflectivity between the frost and the one or more objects within the particular range of infrared wavelengths detectable by the infrared camera.

17. A method for controlling defrost of a chilled environment, comprising:
receiving, at a defrost control unit, an image of one or more objects located in the chilled environment from an infrared camera that is configured to capture images of the one or more objects by detecting light within a particular range of wavelengths within an infrared wavelength spectrum;
analyzing, by the defrost control unit, the image of the one or more objects to quantify an amount of frost formation on the one or more objects, wherein quantifying the amount of frost formation on the one or more objects includes analyzing a brightness level of light reflected off the one or more objects in the infrared wavelength spectrum and inversely proportionally correlating the amount of frost formation to the brightness level of the one or more objects as a result of frost being less reflective in the particular infrared wavelength spectrum than the one or more objects without frost, such that a low brightness level of the one or more objects in the image correlates to a high amount of frost formation and a high brightness level of the one or more objects in the image correlates to a low amount of frost formation, the low brightness level being lower than the high brightness level and the high amount of frost formation being greater than the low amount of frost formation;
determining when to initiate a defrost cycle in the chilled environment based on the amount of frost formation on the one or more objects; and
in response to determining to initiate the defrost cycle, initiating the defrost cycle by sending a defrost control signal to a defroster, wherein the defroster is configured to perform the defrost cycle within the chilled environment in response to receiving the defrost control signal.

18. The method of claim 17, further comprising:
repeatedly performing the following during the defrost cycle until less than or equal to a threshold amount of frost is detected on the one or more objects:
receiving an additional image of the one or more objects from the infrared camera;
analyzing the additional image of the one or more objects to quantify an amount of remaining frost on the one or more objects; and
determining whether the amount of remaining frost on the one or more objects is less than or equal to the threshold amount of frost; and
in response to determining that the amount of remaining frost on the one or more objects is less than or equal to the threshold amount of frost, stopping the defrost cycle.

19. The method of claim 17, wherein
quantifying the amount of frost formation on the one or more objects includes determining, based on analysis of the image of the one or more objects captured by the infrared camera, a quantity of fins of an evaporator on which at least a threshold amount of frost has accumulated; and
initiating the defrost cycle within the chilled environment is performed in response to identifying that the quantity of the fins of the evaporator on which at least the threshold amount of frost has accumulated meets or exceeds a threshold quantity of fins.

20. The system of claim 1, wherein the infrared camera includes a bandpass filter configured to pass light within a band of wavelengths extending from (i) a first wavelength that is greater than or equal to 2.8 micrometers, to (ii) a second wavelength that is less than or equal to 3.2 micrometers, and block light outside the band of wavelengths.

* * * * *